United States Patent [19]
Watanabe

[11] Patent Number: 5,633,768
[45] Date of Patent: May 27, 1997

[54] SHEET METAL FRAME CONSTRUCTION FOR A DISK APPARATUS

[75] Inventor: Takashi Watanabe, Ichikawa, Japan

[73] Assignee: TEAC Corporation, Japan

[21] Appl. No.: 723,668

[22] Filed: Sep. 30, 1996

Related U.S. Application Data

[63] Continuation of Ser. No. 329,525, Oct. 26, 1994, abandoned.

[30] Foreign Application Priority Data

| Oct. 27, 1993 | [JP] | Japan | ................................ | 5-058055 U |
| Oct. 27, 1993 | [JP] | Japan | ................................ | 5-058056 U |
| Oct. 27, 1993 | [JP] | Japan | ................................ | 5-058057 U |
| Oct. 27, 1993 | [JP] | Japan | ................................ | 5-058058 U |

[51] Int. Cl.$^6$ ............................................. G11B 33/00
[52] U.S. Cl. .................... 360/99.01; 360/97.01; 360/900; 369/75.1; 361/685; 361/829
[58] Field of Search .......................... 360/99.07, 99.06, 360/99.03, 99.02, 99.01, 97.04, 97.02, 97.01, 900, 105, 106; 361/685, 829; 369/75.1

[56] References Cited

U.S. PATENT DOCUMENTS 5,243,480  9/1993  Tangi et al. ...................... 360/99.02
5,400,198  3/1995  Suzuki et al. ..................... 360/99.06

FOREIGN PATENT DOCUMENTS 4-132693  12/1992  Japan .
4-132694  12/1992  Japan .

*Primary Examiner*—Craig A. Renner
*Attorney, Agent, or Firm*—Andrus, Sceales, Starke & Sawall

[57] ABSTRACT

There is provided a frame construction for a disk apparatus of which manufacturing cost is reduced by reducing a number of parts and a number of assembly processes. A cartridge accommodating a recording medium is loaded in the disk apparatus. A driving unit for driving the recording medium loaded in the disk apparatus and a head carriage having a head for recording/reproducing information on/from the recording medium are provided in the frame construction. The frame construction has a frame body formed of a metal plate by means of bending, the frame body having a base, a side plate and a back plate, the driving unit and the head carriage being mounted on the base, and the side plate and the back plate being formed by bending perpendicularly to the base. A fixing member for connecting the side plate and the back plate is provided in the frame construction so that the side plate and the back plate are fixed to each other.

6 Claims, 10 Drawing Sheets

FIG. 14
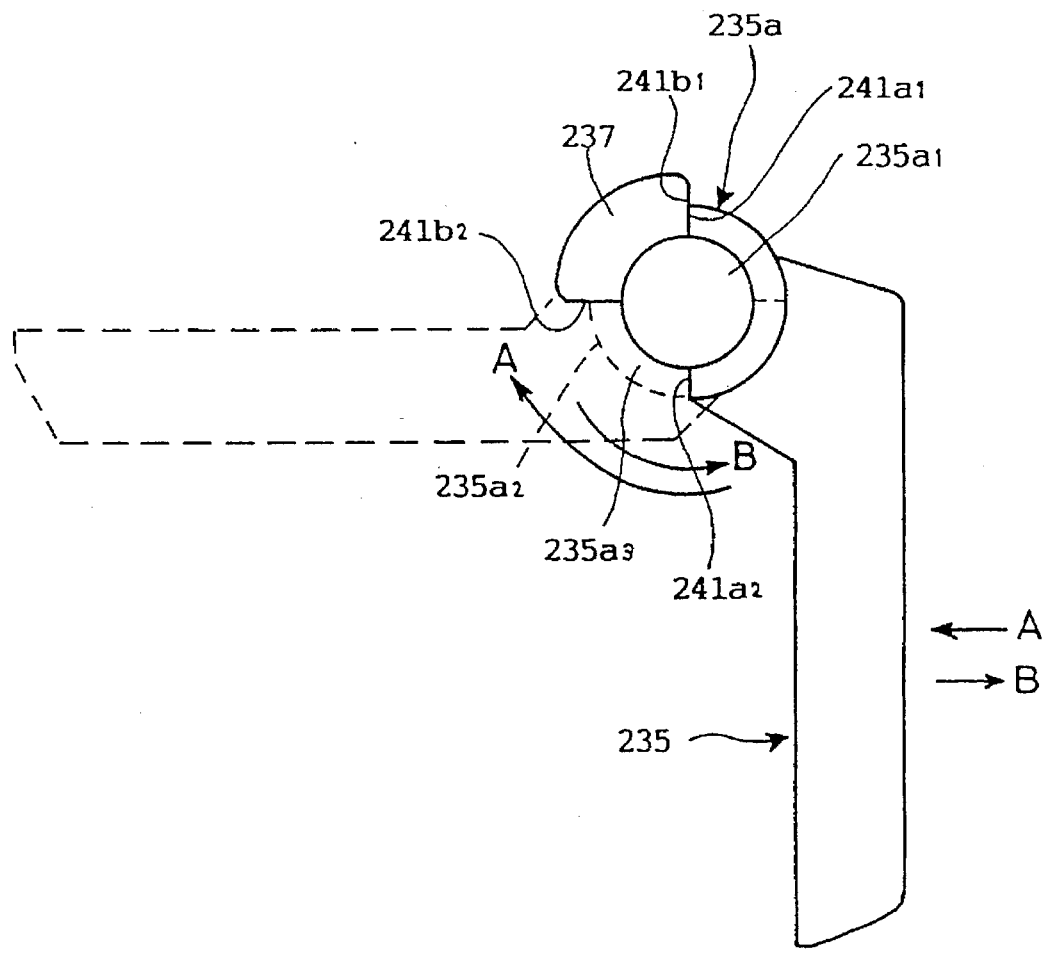
FIG. 15A    FIG. 15B
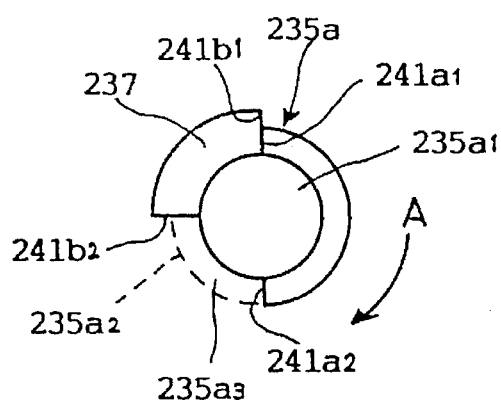 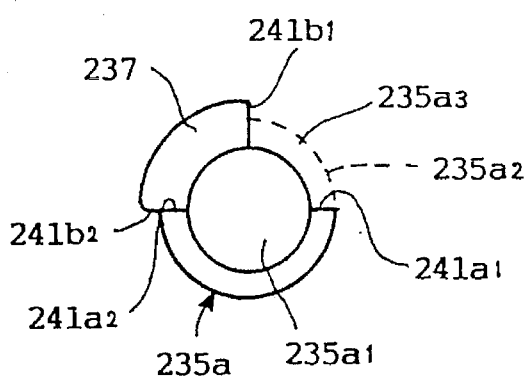

SHEET METAL FRAME CONSTRUCTION FOR A DISK APPARATUS

The present application is a continuation application of U.S. patent application, Ser. No. 08/329,525, filed Oct. 26, 1994, now abandoned.

BACKGROUND OF THE INVENTION

The present invention generally relates to a disk apparatus, and more particularly to a frame construction of a disk apparatus in which a slider and a holder are arranged on a frame for loading a cartridge of a recording medium in the frame.

FIG. 1 is a perspective view of a conventional disk apparatus. In FIG. 1, the conventional disk apparatus 11 comprises a frame 12, a slider 13 attached on the frame 12 and a holder 14. The holder 14 is provided for supporting a disk cartridge in which a disk as a recording medium is accommodated. On each of the side faces of the holder 14, two projections 14a are formed. The slider 13 slides so as to move the holder 14 from an insertion position of the disk cartridge to a loaded position. The slider 13 returns to the insertion position when an eject button (not shown in the figure) is pressed. On each of the side faces of the slider 13, tapered grooves 13a corresponding to the respective projections 14a of the holder 14 are formed.

The frame 12, formed by means of aluminum die casting, comprises a base 12a, side plates 12b provided on each side of the base 12a and a back plate 12c. A driving motor 14 driving a disk in the disk cartridge and a head carriage (not shown in the figure) are provided on the base 12a. A carriage motor (not shown in the figure) for moving the head carriage is mounted on the back plate 12c. A latch lever 17 is attached on a pin 15 provided on the base 12a. The latch lever 17 latches the slider 13 at a predetermined position.

As mentioned above, since the frame 12 of the conventional disk apparatus is formed by means of aluminum die casting, a manufacturing tool such as a die cast machine is needed for manufacturing the frame 12. Accordingly, a large investment is needed for manufacturing the frame 12. Additionally, the material for the aluminum die casting is relatively expensive, and thus there is a problem that a cost reduction of the frame 12 is difficult.

SUMMARY OF THE INVENTION

It is a general object of the present invention to provide an improved and useful frame construction of a disk apparatus in which frame construction the above-mentioned disadvantages are eliminated.

A more specific object of the present invention is to provide a frame construction for a disk apparatus for which manufacturing cost is reduced by reducing a number of parts and a number of assembly processes.

In order to achieve the above-mentioned objects, there is provided a frame construction for a disk apparatus in which a cartridge accommodating a recording medium is loaded, in which frame construction a driving unit for driving the recording medium loaded in the disk apparatus and a head carriage having a head for recording/reproducing information on/from the recording medium are provided, the frame construction comprising:

a frame body formed of a metal plate by means of bending, the frame body having a base, a side plate and a back plate, the driving unit and the head carriage being mounted on the base, the side plate and the back plate being formed by bending perpendicularly to the base;

a fixing member for connecting the side plate and the back plate so that the side plate and the back plate are fixed to each other.

According to the present invention, since the frame body is formed of a metal plate by means of bending, the frame body can be manufactured using, for example, a press machine without needing a die cast machine (including machining tools) which is a large scale manufacturing tool. Accordingly, the tooling cost and the material cost for the frame body can be reduced, and further cost reduction can be achieved as the number of assembly processes is reduced. Additionally, since the side plate and the back plate are fixed by the fixing member, an accurate perpendicularity of the side plate and the back plate with respect to the base plate can be achieved, and a rigid frame construction can be obtained while reducing a number of parts and a number of assembly processes.

Other objects, features and advantages of the present invention will become more apparent from the following detailed description when read in conjunction with the accompanying drawings.

BRIEF DESCRIPTION OF THE DRAWINGS

FIG. 14 is an illustration for explaining an operation of the flap shown in FIG. 12; and FIGS. 15A and 15B are illustrations for explaining a positional relationship between a protrusion and a cut-away portion shown in FIG. 14.

DETAILED DESCRIPTION OF THE PREFERRED EMBODIMENT

Figure 1:
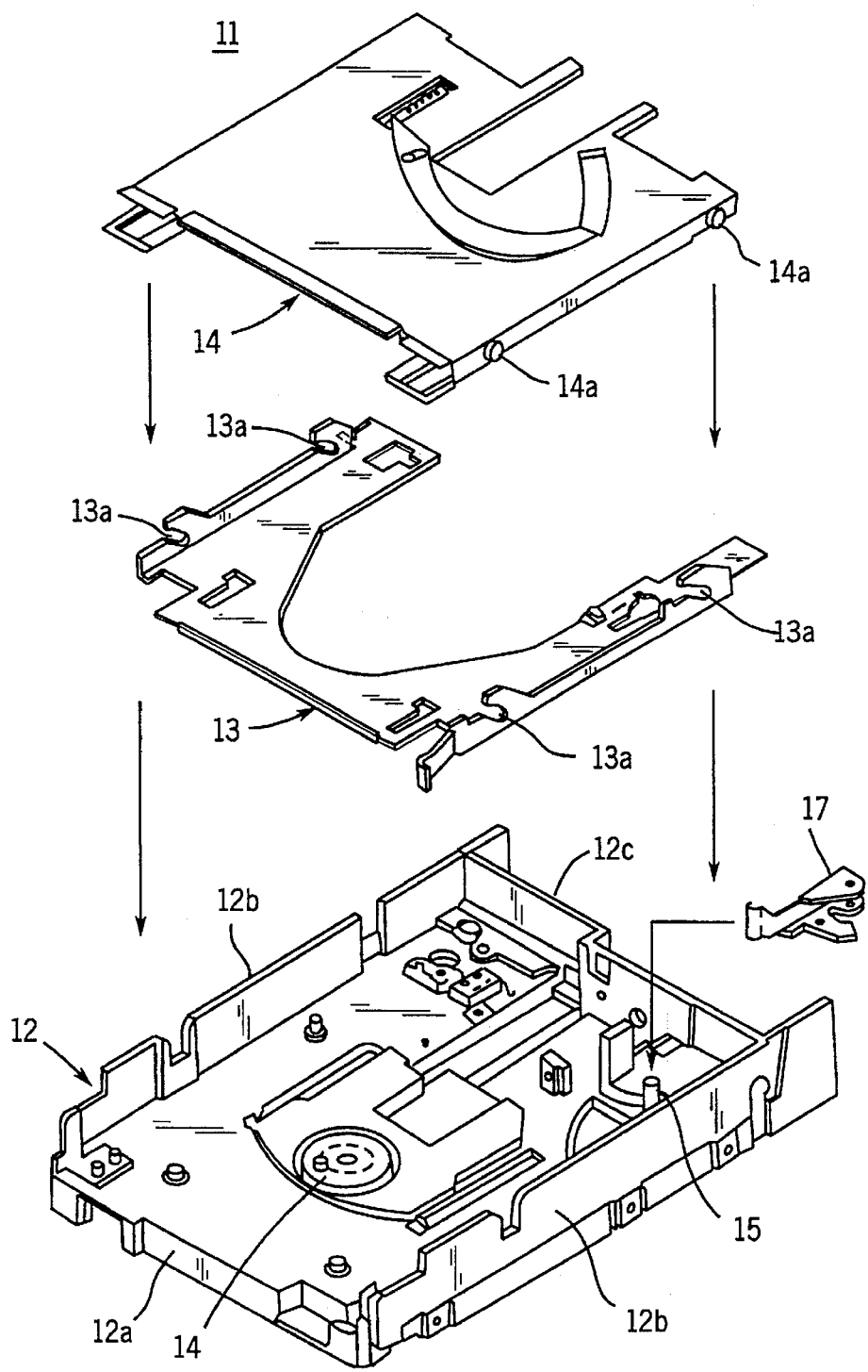
FIG. 1 is a perspective view of a conventional disk apparatus.
Figure 2:
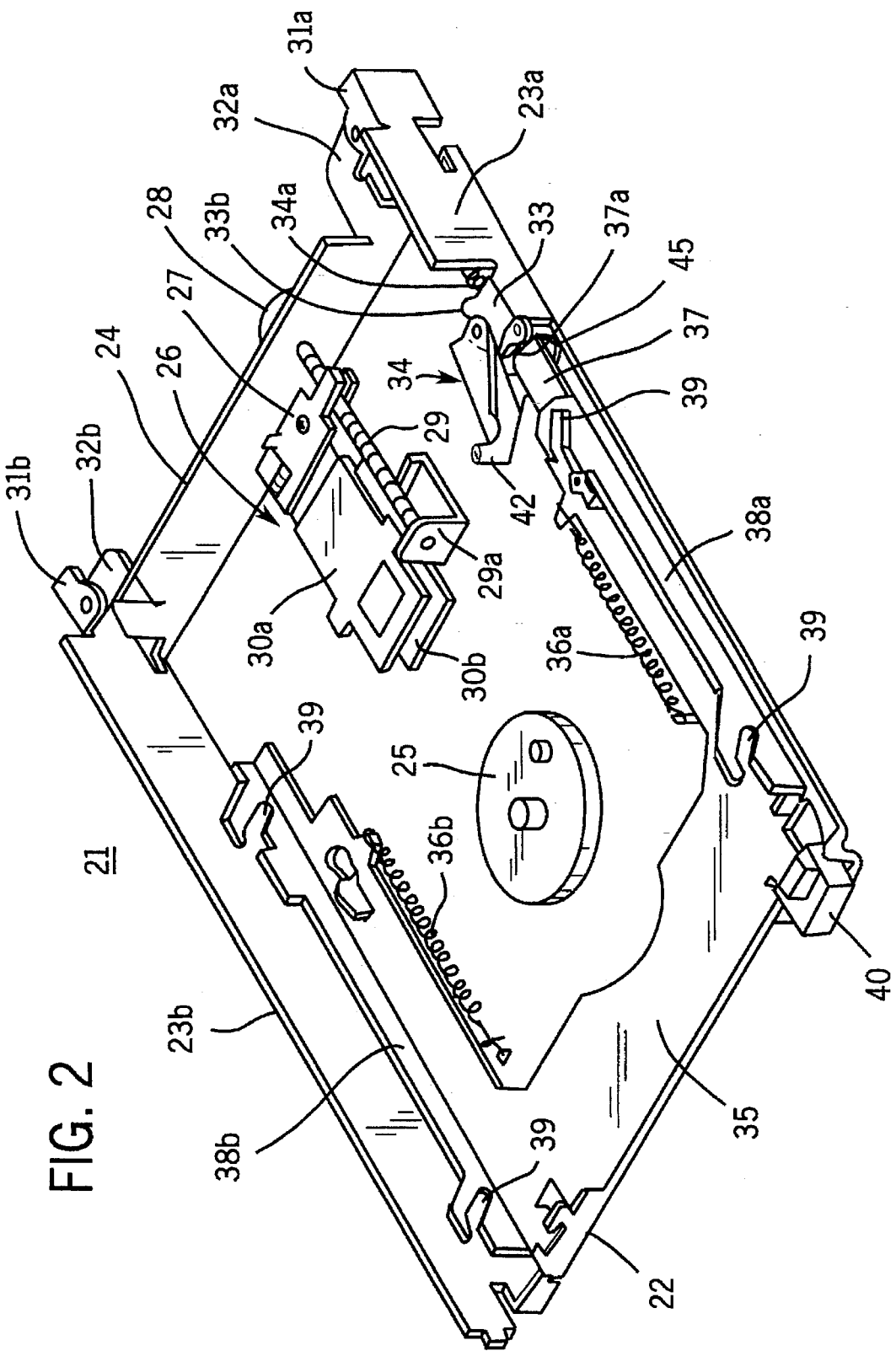
FIG. 2 is a perspective view of an embodiment of a frame construction according to the invention.

A description will now be given, with reference to FIG. 2, of an embodiment of a frame construction according to the present invention. FIG. 2 is a perspective view of the embodiment of the frame construction according to the invention. The slider and holder shown in FIG. 1 are mounted on a frame 21 shown in FIG. 2.

The frame 21 is formed of a plate-like metal member such as a steel plate by means of bending. Side plates 23a and 23b are respectively raised from each side of the frame 21, and a back plate 24 is raised from a back side of the frame 21. A disk driving motor 25 is arranged on a base 22. The disk driving motor 25 rotates a magnetic disk accommodated in a disk cartridge (not shown in the figure) when the disk cartridge is loaded in the disk apparatus.

Additionally, a head carriage mechanism 26 is provided on the base 22. The head carriage mechanism 26 comprises a carriage 27 and a carriage motor 28 which is attached on the back plate 24. The carriage 27 engages with a ball screw 29 which is mounted on a rotational shaft of the carriage motor 28 and is supported by a supporting plate 29a, and is movable in an axial direction of the ball screw 29. The carriage 27 has an upper plate 30a and a lower plate 30b, and is provided with a magnetic head (not shown in the figure) on each end thereof.

First fixing portions 31a and 31b are formed on rear portions (close to the back plate 24) of the respective side plates 23a and 23b which are opposite to each other, the first fixing portions being bent inwardly. Second fixing portions 32a and 32b are formed on each side of the back portions 24, the second fixing plate being bent outwardly. The first fixing portions 31a and 31b partially overlap with the respective second fixing portions 32a and 32b, and are fastened by means of a screw.

A mounting portion 33 which is bent inwardly is formed on the side plate 23a. A latch lever 34 is rotatably mounted in a position between the mounting portion 33 and a protrusion (not shown in the figure) on the base 22. The latch lever 34 has an engaging claw 45 which engages with a slider (described later). The latch lever 34 is biased toward the insertion position of the disk cartridge by a coil spring 34a.

A slider 35 is mounted on the base 22. The slider 35 is formed with a channel-like shape, and biased toward the insertion position by coil springs 36a and 36b. An engaging portion 37 engaging with the engaging claw 45 of the latch lever 34 is provided on an end of the slider 35.

The slider 35 has side plates 38a and 38b on each side thereof. Each of the side plates 38a and 38b has tapered grooves 39 which fit on the respective protrusions of the holder (refer to 14a of FIG. 1) so as to slide the holder. It should be noted that an eject button 40 is provided on an insertion position side of the side plate 38a of the slider 35.

Figure 3:
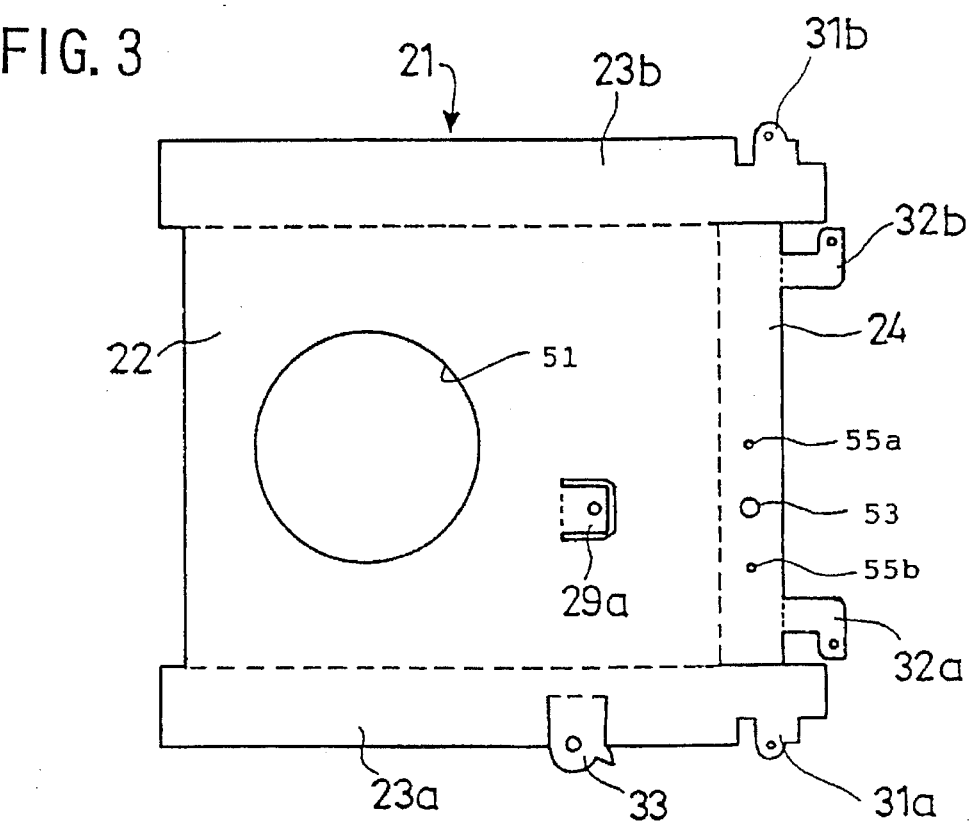
FIG. 3 is a plan view showing the frame of FIG. 2 in a state before it is subjected to a bending process.

FIG. 3 is a plan view showing the frame of FIG. 2 in a state before it is subjected to a bending process. As shown in FIG. 3, the frame 21 is made from a single steel plate. A hole 51 for mounting the driving motor 25 is formed on a portion corresponding to the base 22. Portions corresponding to the side plates 23a and 23b, the back plate 24, the first fixing portions 31a and 31b and the second fixing portions 32a and 32b are formed in corresponding shapes. A portion corresponding to the mounting portion 33 is formed on the side plate 23a.

That is, the first fixing portions 31a and 31b are integrally formed protruding outwardly from the respective side plates 23a and 23b. The second fixing portions 32a and 32b are formed as an L-like shape so that they extend outwardly from the back plate 24 and toward the respective side plates 23a and 23b.

It should be noted that a hole 53 is provided on the back plate 24 for extending the ball screw 29 from the carriage motor 28, and holes 55a and 55b are provided for mounting the carriage motor 28 on the back plate 24.

The frame 21 cut out in the above-mentioned shape is bent perpendicularly by using a press machine at one time along dotted lines in the figure. That is, the side plates 23a and 23b, the back plate 24 and supporting plate 29a are bent perpendicularly with respect to the base 22. Additionally, the first fixing portions 31a and 31b are bent inwardly and perpendicularly with respect to the respective side plates 23a and 23b. The second fixing portions 32a and 32b are bent outwardly and perpendicularly with respect to the back plate 24. Additionally, the mounting portion 33 of the side plate 23a is bent inwardly and perpendicularly.

Figure 4A:
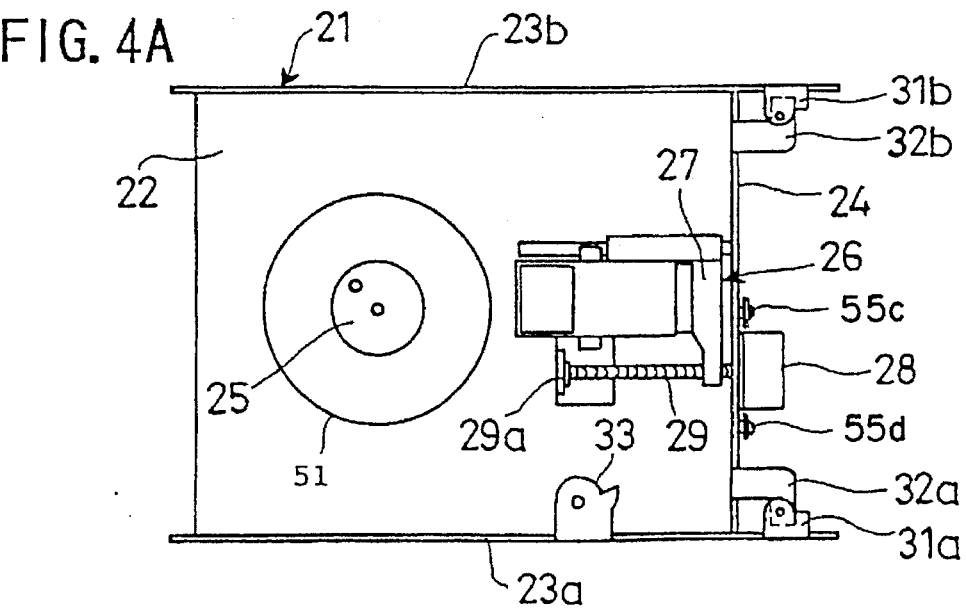
FIG. 4A is a plan view of the frame shown in FIG. 3 in an assembled state.
Figure 4B:
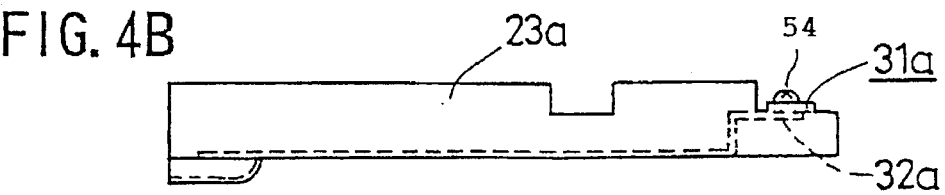
FIG. 4B is a side view of the frame shown in FIG. 4A.

As shown in FIGS. 4A and 4B, the first fixing portions 31a and 31b overlap the respective second fixing portions 32a and 32b. In this state, holes provided on each of the first and second fixing portions 31a, 31b, 32a and 32b are aligned, and then they are fastened by using a screw 54. Additionally, the driving motor 25 is mounted on the hole 51 on the base 22, and the carriage motor 28 is mounted on the back plate 24 by means of screws 55c and 55d. The ball screw 29 is inserted through the hole 53 to the supporting plate 29a so that the ball screw 29 is provided between the supporting plate 29a and a rotational shaft of the carriage motor 28, and the carriage 27 engages with the ball screw 29.

As mentioned above, since the frame 21 is formed from a single steel plate by bending using a press machine, manufacturing tools are not as large as compared to the die casting, and thus the tooling cost and the material cost can be reduced. Accordingly, a cost reduction can be achieved by reducing a number of parts and a number of assembly processes.

Additionally, since the back plate 24 is firmly fixed to the side plates 23a and 23b, an accurate alignment of the head carriage mechanism 26 can be achieved.

Figure 5A:
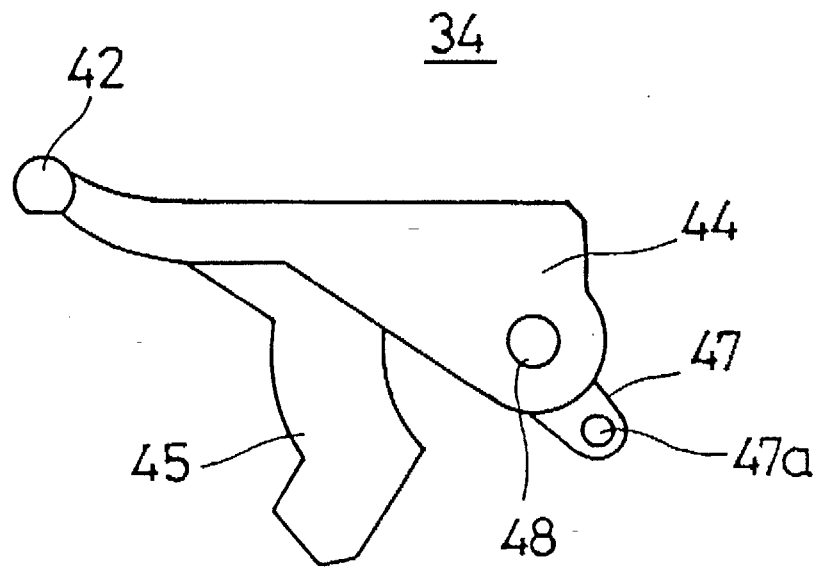
FIG. 5A is a plan view of a latch lever shown in FIG. 2.
Figure 5B:
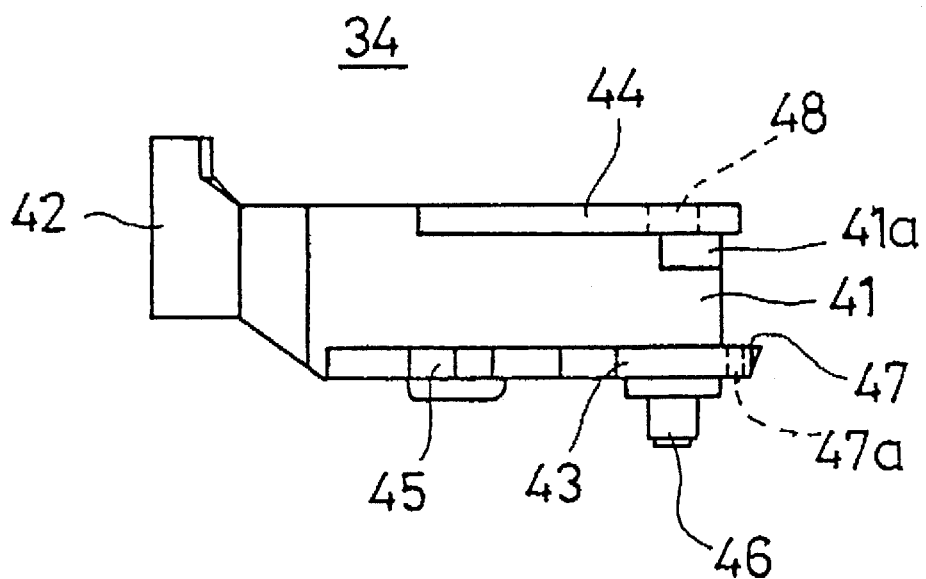
FIG. 5B is a front view of the latch lever shown in FIG. 5A.

A description will now be given of an operation of the latch lever 34. FIG. 5A is a plan view of the latch lever 34, and FIG. 5B is a front view of the latch lever 34.

The latch lever 34 comprises a touching member 42, having generally a cylindrical shape, integrally formed with a rotational member 41 at one end thereof. The rotational member 41 has a first fitting portion 43 and a second fitting portion 44 spaced from each other in a direction of a width of the rotational member 41. Additionally, the rotational member 41 has the engaging claw 45 which is integrally formed with the first fitting portion 43.

The first fitting portion 43 is provided with a pin 46 protruding downwardly, and is integrally formed with a hooking portion 47 on which a hole 47a is formed to hook the coil spring 34a. A fitting hole 48 is formed on the second fitting portion 44. The pin 46 and the fitting hole 48 are aligned on the same axis about which the latch lever 34 pivots. A notch 41a is formed on the inner side of the rotating member 41.

Figure 6:
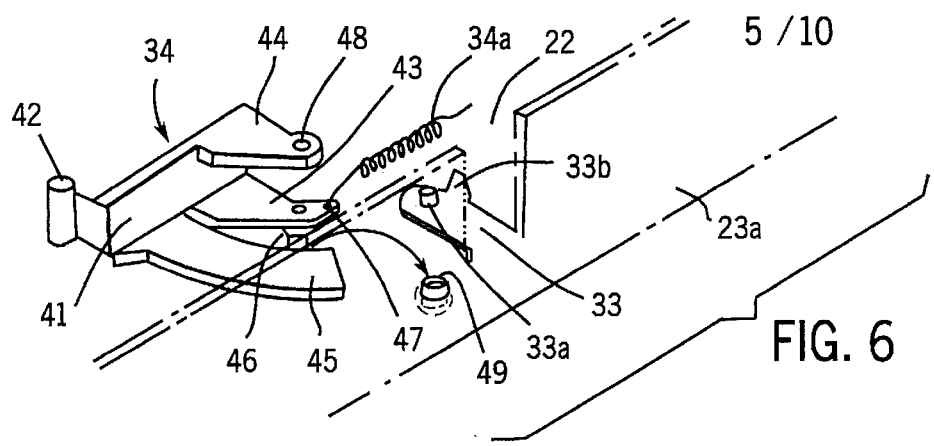
FIG. 6 is a perspective view of the latch lever in a fitted state.

FIG. 6 is a perspective view of the latch lever 34 in a fitted state. As shown in FIG. 6, a protrusion 49 having an inside diameter greater than a diameter of the pin 46 is formed on the base 22 by means of, for example, burring. Additionally, the mounting portion 33 is formed at a predetermined position of the side plate 23a. The mounting portion 33 is provided with a pin 33a for loosely fitting the fitting hole 48. A stopper 33b is integrally formed with the mounting portion 33. The pin 33a and the protrusion 49 are aligned on the same axis.

The pin 46 of the first fitting portion of the latch lever 34 is loosely fitted inside the protrusion 49. The pin 33a of the mounting portion 33 is loosely fitted in the fitting hole 48 of the second fitting portion 44. By this arrangement, the latch lever 34 is pivotally mounted on the base 22. Additionally, an end of the coil spring 34a biasing the touching portion 42 of the latch lever 34 toward the inserting position is hooked to the hole 47a of the hooking portion 47.

Figure 7A:
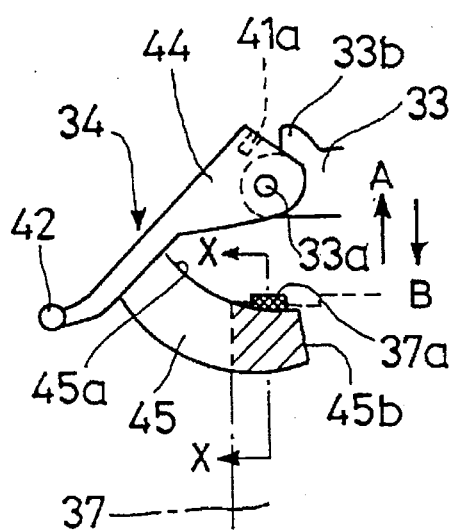
FIG. 7A is a view showing a state in which a slider is latched.
Figure 7B:
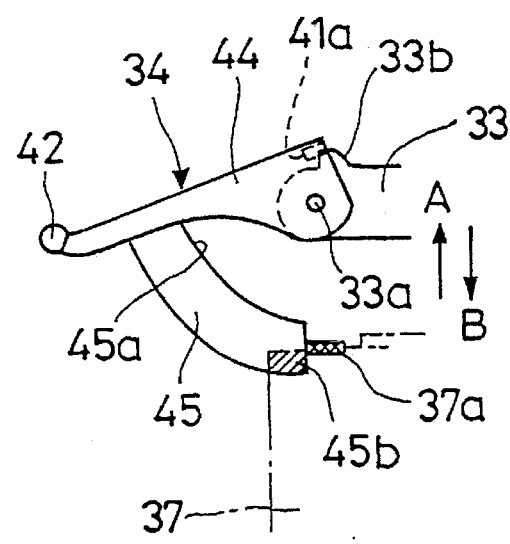
FIG. 7B is a view showing a state in which the slider is unlatched.
Figure 7C:
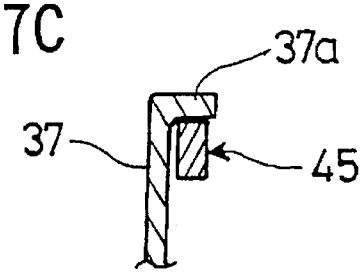
FIG. 7C is a cross-sectional view taken along a line X—X of FIG. 7A.

A description will now be given, with reference to FIGS. 7A through 7C, of a latching operation of the latch lever 34. FIG. 7A is a view showing a state in which the slider is latched; FIG. 7B is a view showing a state in which the slider is unlatched; FIG. 7C is a cross-sectional view taken along a line X—X of FIG. 7A.

In FIG. 7A, when a disk cartridge is inserted, the disk cartridge presses the touching member 42 of the latch lever 34 in a direction indicated by an arrow A. Accordingly, the latch lever 34 pivots about the pins 33a and 46. According to this, the engaging claw 37a of the engaging portion 37 of the slider 35 moves from a position in which the engaging claw 37a is in contact with an inner surface 45a of the engaging claw 45 of the latch lever 34 to a position in which the engaging claw 37a is in contact with an end surface 45b of the engaging claw 45. Accordingly, a holder (not shown in the figure) moves down to move the disk cartridge in a loaded position as shown in FIG. 7B.

In the state shown in FIG. 7B, an area (indicated by a hatched portion) where the engaging claw 45 overlaps with the engaging portion 37 of the slider 35 is minimized, and thus the latch lever 34 is easily removed from its assembled position. However, since the stopper 33b of the mounting portion 33 comes in contact with the notch 41a formed on the rotational member 41 of the latch lever 34, the latch lever is prevented from being removed from the assembled position.

On the other hand, when the eject button 40 is pressed to eject the disk cartridge, the latch lever 34 pivots in a direction indicated by an arrow B by a biasing force of the coil spring 34a. The engaging claw 37a of the engaging portion 37 then moves to the position in which the engaging claw 37a is in contact with the inner surface 45a of the engaging claw 45, as shown in FIG. 7A.

In this state, the holder moves up, and then the disk cartridge is pushed out from the cartridge inserting side.

In the state shown in FIG. 7A, the stopper 33b of the mounting portion 33 is not engaged with the notch 41a formed on the rotating member 41. However, the area (indicated by a hatched portion) where the engaging claw 45 overlaps with the engaging portion 37 of the slider 35 is increased, and thereby the latch lever 34 is prevented from being removed from the assembled position even though the stopper 33b is not engaged with the notch 41a.

As mentioned above, the latch lever 34 does not need a long pin used in a conventional latch lever mechanism, a retainer washer and a jig used for assembling the long pin and the retaining washer, and thus an assembly of the latch lever is simplified. Accordingly, a number of parts and a number of assembling processes are reduced, and thus a manufacturing cost of the disk apparatus is reduced.

A description will now be given of an erroneous insertion preventing mechanism for a disk cartridge, which mechanism is suitable for the disk apparatus having the frame construction according to the present invention. The erroneous-insertion preventing mechanism described below comprises a smaller number of parts as compared to a conventional mechanism. Accordingly, the manufacturing cost of the disk apparatus can be further reduced.

Figure 8:
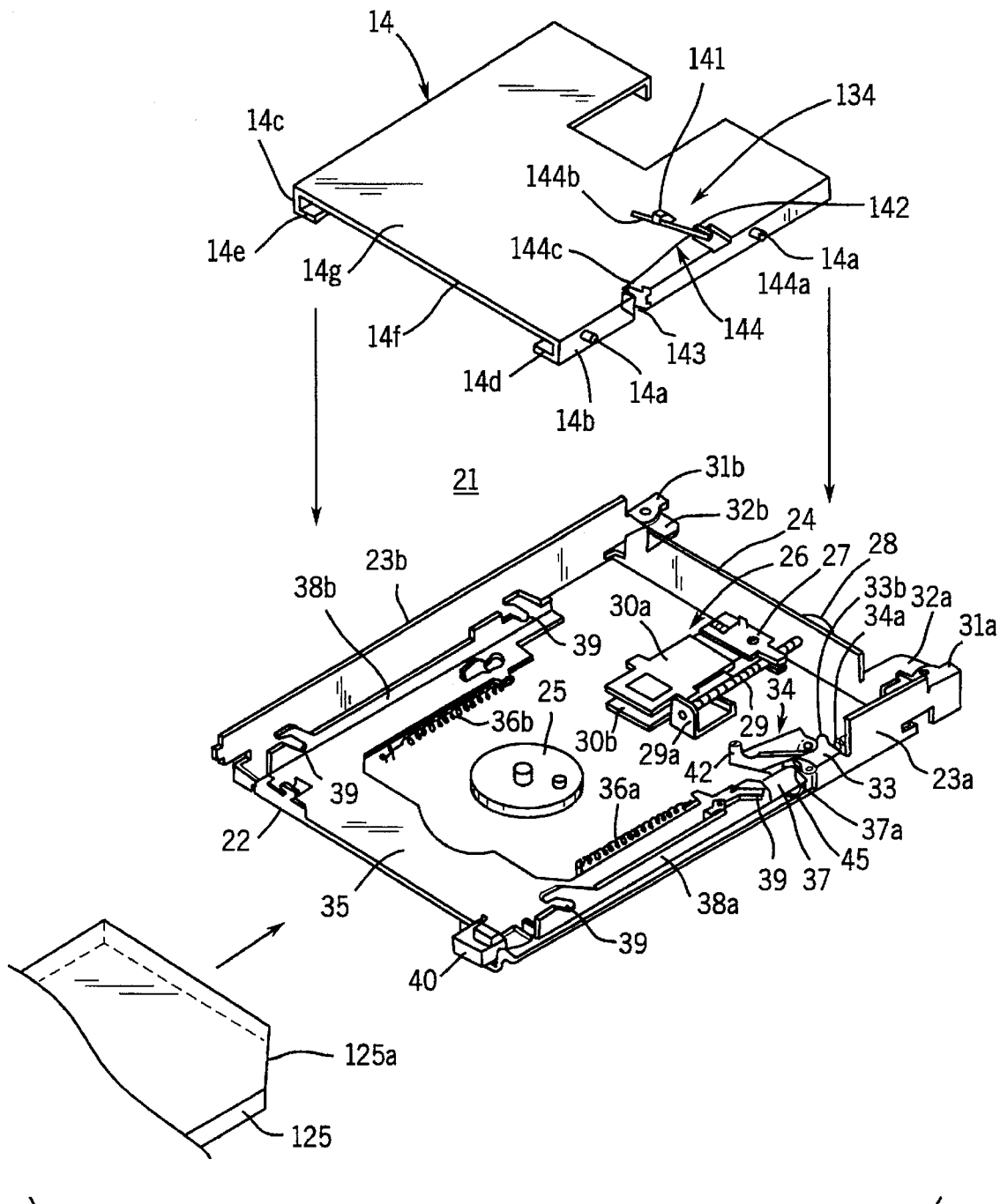
FIG. 8 is an exploded perspective view of a disk apparatus in which an erroneous-insertion preventing mechanism is incorporated.

FIG. 8 is an exploded perspective view of a disk apparatus in which the erroneous-insertion preventing mechanism is incorporated. In FIG. 8, parts that are the same as the parts shown in FIG. 1 are given the same reference numerals, and descriptions thereof will be omitted.

In FIG. 8, the holder 14 is formed from sheet metal by bending by a press machine. The holder 14 comprises a top plate 14g, side plates 14b and 14c, and bottom plates 14d and 14e so that a cartridge insertion space 14f into which a disk cartridge 125 is inserted is formed by those parts. Additionally, the protrusions 14a are formed on each of the side plates 14b and 14c by means of burring, the protrusions being fitted into the respective grooves 39 formed on each of the side plates 38a and 38b of the slider 35. That is, the holder 14 moves up and down by means of the protrusions 14a fitted into the tapered grooves 39 when the slider 35 slides.

Additionally, the holder 14 is provided with an erroneous-insertion preventing mechanism 134 adjacent on a side of the top plate 14g.

It should be noted that the cartridge 125 is inserted into the holder 14 in a state in which a slanting face 125a provided on one of corners of the cartridge 125 is positioned at a right front side.

Figure 9:
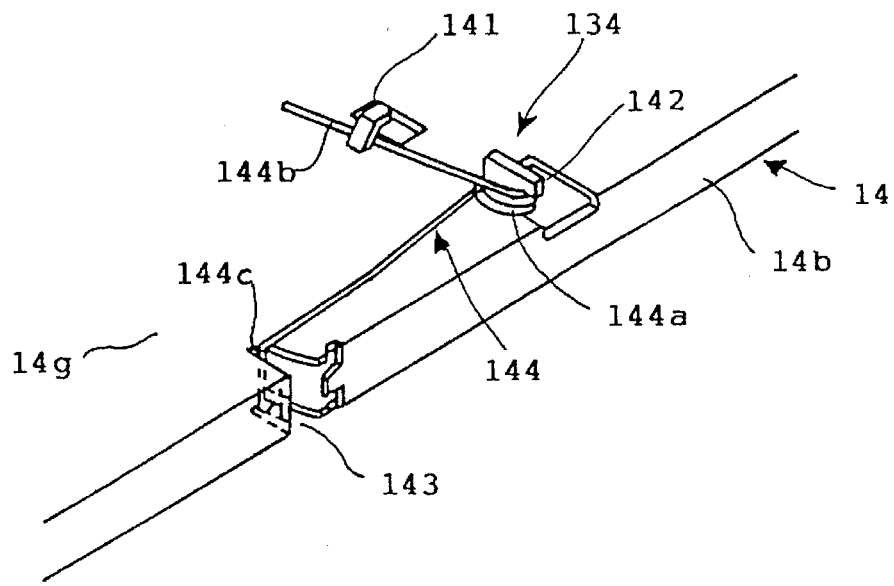
FIG. 9 is a perspective view of the erroneous-insertion preventing mechanism shown in FIG. 8.
Figure 10A:
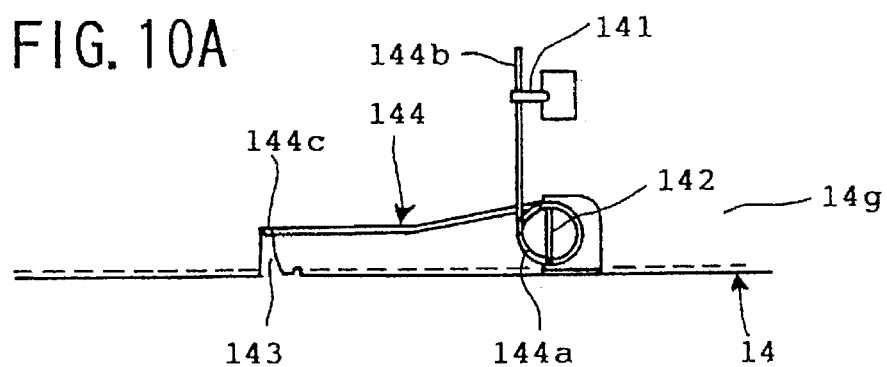
FIG. 10A is a plan view of the erroneous-insertion preventing mechanism shown in FIG. 9.
Figure 10B:
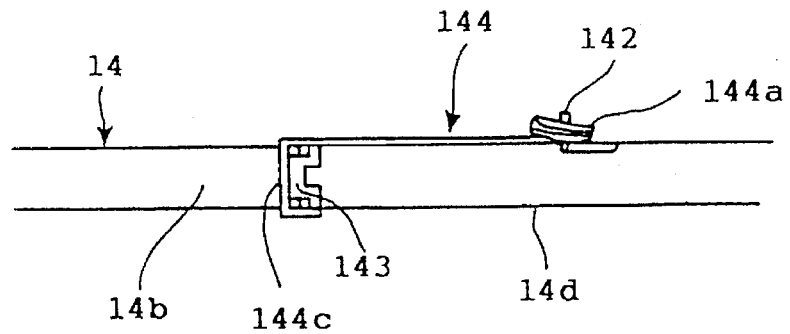
FIG. 10B is a side view of the erroneous-insertion preventing mechanism shown in FIG. 10A.

FIG. 9 is a perspective view of the erroneous-insertion preventing mechanism shown in FIG. 8. FIG. 10A is a plan view of the erroneous insertion preventing mechanism shown in FIG. 9; FIG. 10B is a side view of the erroneous-insertion preventing mechanism shown in FIG. 10A.

An engaging portion 141 and a supporting portion 142 are formed adjacent the side plate 14b of the top plate 14g. A groove 143 having a length equal to a width of the side plate 14b is formed on the side plate 14b.

A torsion spring 144 is assembled on the holder 14 by attaching a winding portion 144a of the torsion spring 144 around the supporting portion 142. An end of a fixing portion 144b extending from the winding portion 144a of the torsion spring 144 is engaged with the engaging portion 141. A touching portion 144c extending from the winding portion 144a of the torsion spring 144 is engaged with an inner face of the groove 143, the touching portion 144c being formed with a hook-like shape so that the touching portion 144c extends from the top plate 14g to the bottom plate 14d. In this case, the touching portion 144c applies a biasing force in a direction toward the inside of the groove 143.

If the torsion spring 144 is made of a thin wire, the biasing force is too small, which condition causes an erroneous operation. If a thick wire is used, a large insertion force is required even if the cartridge 125 is inserted in a correct direction. Accordingly, in order to reduce the insertion force, a distance between the winding portion 144a to the touching portion 144c is lengthened, and a number of turns of the winding portion 144a is increased so as to decrease the spring constant of the torsion spring 144.

Figure 11A:
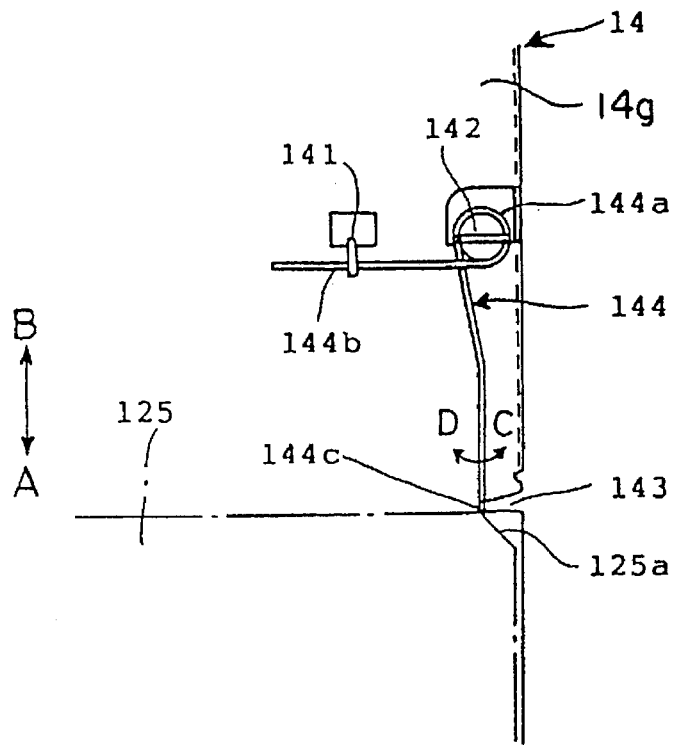
FIGS. 11A and 11B are illustrations for explaining an operation of the erroneous insertion preventing mechanism.
Figure 11B:
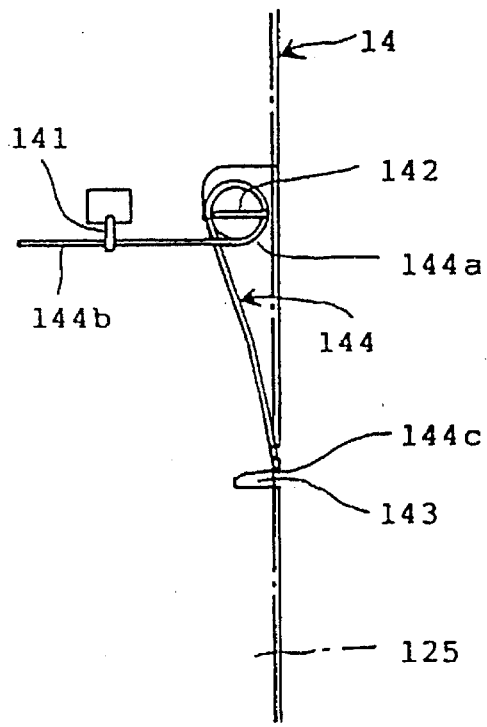

FIGS. 11A and 11B are illustrations for explaining an operation of the erroneous-insertion preventing mechanism. As shown in FIG. 11A, when the disk cartridge 125 is inserted correctly, that is, the slanting surface 125a is positioned at the front right corner, into the cartridge insertion space 14f of the holder 14, the slanting surface 125a faces the touching portion 144c of the torsion spring 144. If the cartridge 125 is pressed and moved in a direction indicated by arrow B, the touching portion 144c makes contact with the slanting surface 125a.

If the cartridge 125 is further moved in the direction indicated by the arrow B, the touching portion 144c of the torsion spring 144 is moved in a direction indicated by arrow C. The touching portion 144c is moved to a position in which the touching portion 144c makes contact with the side surface of the cartridge 125, and thus there is no object blocking the movement of the cartridge 125. Accordingly, the cartridge 125 is loaded in a predetermined position in the holder 14 as shown in FIG. 11B.

On the other hand, when the cartridge 125 is inserted incorrectly, a side of the cartridge 125 makes contact with the touching portion 144c of the torsion spring 144 in a direction perpendicular to the side surface of the cartridge 125. Accordingly, the touching member 144c cannot move in the direction indicated by the arrow C, and thus the insertion of the cartridge 125 is prevented, that is, an erroneous insertion of the cartridge 125 is prevented.

It should be noted that when the cartridge 125 is removed from the holder 14 along a direction indicated by arrow A, the touching portion 144c of the torsion spring 144 returns, as shown in FIG. 11A, to its original position in the groove 143 by the biasing force applied in a direction indicated by arrow D.

As mentioned above, since the erroneous-insertion preventing mechanism 134 is comprised of only a torsion spring 144, and the touching portion 144c is formed with a hook-like shape extending from the top plate 14g to the bottom plate 14d, a prevention of an erroneous insertion of the cartridge 125 can be assured, and the number of parts and the number of assembly processes are reduced, resulting in a reduction in manufacturing costs.

A description will now be given of a front bezel which is suitable for the disk apparatus having the frame construction according to the present invention.

It is a well-known method that a disk cartridge can be inserted into a disk apparatus through an insertion opening of a front bezel by opening a flap (lid) by a pressing force. The flap is usually attached on the front bezel so that the flap is rotatable with respect to opposite ends thereof.

However, the front bezel tends to be thinner as a thickness of the disk apparatus is reduced, and thereby if the flap is attached to the front bezel, the flap tends to come off from the front bezel or a smooth operation of the flap is not performed. In order to eliminate this problem, the flap may be attached to a frame of the disk apparatus. In such a case, the front bezel should be assembled after the flap is attached to the frame, and means for limiting the rotation of the flap is required.

Figure 12:
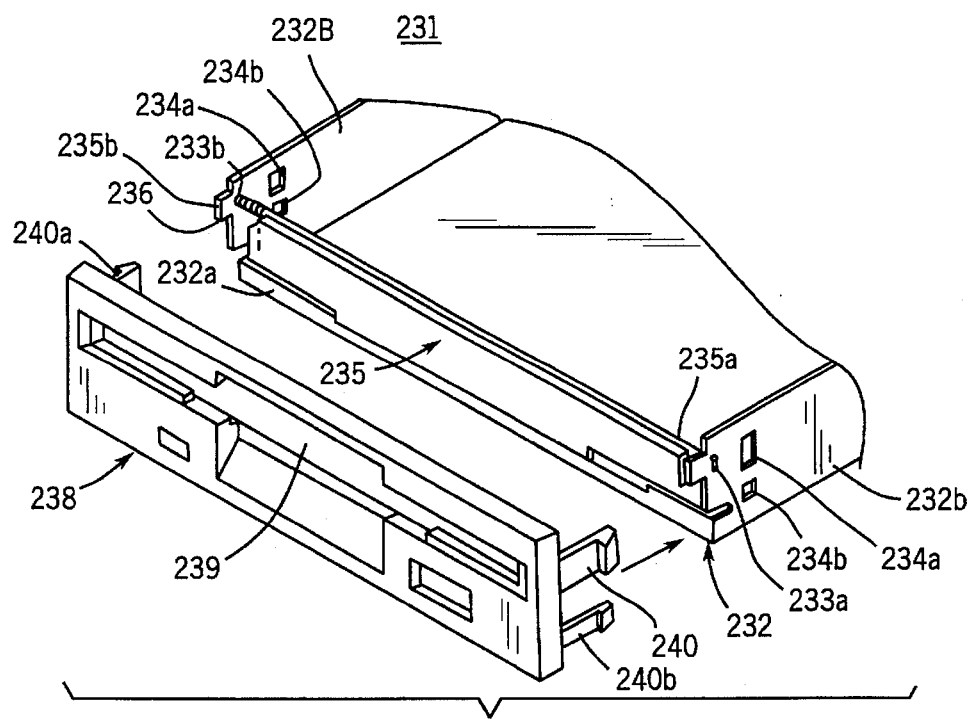
FIG. 12 is a perspective view of an example in which a flap is attached to a frame.
Figure 13:
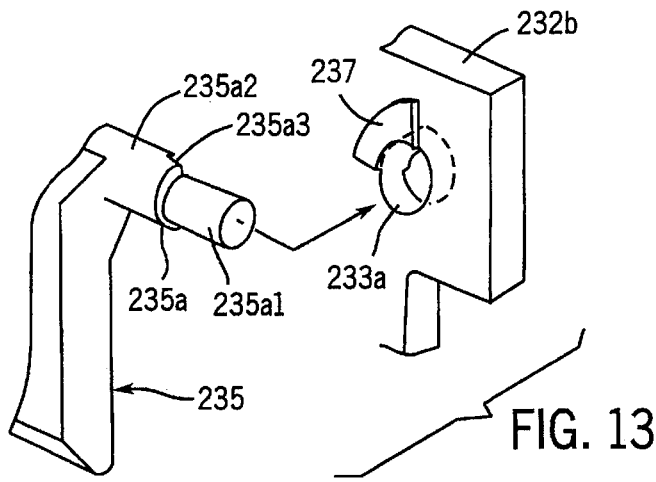
FIG. 13 is a perspective view of attaching portions of the flap and the frame shown in FIG. 12.

FIG. 12 is a perspective view of an example in which a flap is attached to a frame. FIG. 13 is a perspective view of attaching portions of the flap and the frame shown in FIG. 12.

In a disk apparatus 231 shown in FIG. 12, a frame 232 as a main body of the disk apparatus 231 is, for example, made of a steel plate, and comprises a base 232a and side plates 232b on either side of the base plate 232a. Through holes 233a and 233b are formed on each of the side plates 232b on an insertion side of the cartridge. Fixing holes 234a and 234b are formed on each of the side plates 232b for fixing a front bezel 238.

It should be noted that a slider and a holder are mounted on the frame 232 for loading the disk cartridge, and a cover is provided as a top plate over the side plates 232b.

Shafts 235a and 235b formed on a flap 235 are inserted into the respective through holes 233a and 233b from an inner side of each of the side plates 232b, and thus the flap 235 is rotatably supported about the shafts 235a and 235b.

A torsion spring 236 is fitted on the shaft 235b, one end of the torsion spring 236 being engaged with the side plate 232b and the other end being engaged with the flap 235. The torsion spring 236 is provided for pressing the flap 235 toward the insertion side.

The shaft 235a of the flap 235 comprises, as shown in FIG. 13, an insertion portion 235a1 being inserted into the through hole 233a and a shaft portion 235a2 having a diameter greater than that of the insertion portion 235a1. A cut-away portion 235a3 as a first engaging part, which is cut away in an arc-like shape of about 180 degrees with a predetermined width, is formed on the shaft portion 235a2. The shafts 235a and 235b are integrally formed with flap 235 as a plastic part.

A 90-degree arc-like protrusion 237 is formed, as a second engaging part, on a periphery of the through-hole 233a. The protrusion 237 makes contact with the cut-away portion 235a3 when the insertion portion 235a1 is inserted into and supported by the through hole 233a.

Accordingly, if when the flap 235 is rotated, the cut-away portion 235a3 makes contact with the protrusion 237, resulting in limiting the rotation of the flap 235.

The front bezel 238 being formed of a thin plastic has an insertion opening 239 through which the disk cartridge is inserted. The front bezel 238 is integrally formed with attaching tabs 240a and 240b on each side thereof. The attaching tabs 240a and 240b are engaged with the respective fixing holes 234a and 234b formed on each of the side plates 232b.

When the front bezel 238 is assembled to the frame 232, the flap 235, the rotatable range of which is limited by the cut-away portion 235a3 and the protrusion 237, is positioned inside the insertion opening 239. The flap 235 is opened by being pressed by the disk cartridge from the insertion opening 239, and then the disk cartridge is loaded further inside the disk apparatus. FIG. 14 is an illustration for explaining an operation of the flap shown in FIG. 12. FIGS. 15A and 15B are illustrations for explaining a positional relationship between the protrusion 237 and the cut-away portion shown in FIG. 14.

FIG. 14 shows a state where the flap 235 closes the insertion opening 239 of the front bezel 238. That is, the flap 235 is pressed in a direction indicated by arrow B by means of the torsion spring 236, and an end 241a1 of the cut-away portion 235a3 is in contact with an end 241b1 of the protrusion 237 in which condition the rotation of the flap 235 is limited.

When the disk cartridge is inserted through the insertion opening 239 of the front bezel 238, the flap 235 is rotated by a pressing force exerted by the disk cartridge along a direction indicated by arrow A to open the insertion opening 239. At this time, when the flap 235 is rotated (about 90 degrees) to a horizontal position as shown in FIG. 15B, the other end 241a2 of the cut-away portion 235a3 makes contact with the other end 241b2 of the protrusion 237 in which condition the rotation of the flap 235 is limited.

It should be noted that when the disk cartridge is ejected, the flap 235 returns to its original position shown in FIG. 14 by means of the torsion spring 236 so as to close the insertion opening 239 of the front bezel 238.

As mentioned above, even if a thickness of the front bezel 238 is reduced to make the disk apparatus thinner, no influence is made on the inserting operation of the disk cartridge by attaching the flap 235 to the side plates 232b of the frame 232. Additionally, a rotation of the flap 235 can be limited in a predetermined range by a simple construction in which the cut-away portion 235a3 formed on the shaft 235a is engaged with the protrusion 237 formed on the periphery of the through hole 233a of the side plate 232b without affecting the inserting operation of the disk cartridge and attachment of the front bezel 237 and the flap 235.

It should be noted that the above-mentioned rotation-limiting mechanism may be provided on a shaft 235b side or may be provided on both sides.

Additionally, although in the above example the cut-away portion 235a3 is formed on the shaft 235a and the protrusion is formed on the side plate 232b, a protrusion may be formed on the shaft 235a and a cut-away portion may be formed on the side plate 232b.

The present invention is not limited to the specifically disclosed embodiments, and variations and modifications may be made without departing from the scope of the present invention.

What is claimed is:

1. A frame construction for a disk apparatus into which a cartridge accommodating a recording medium is loaded, a driving unit for driving the recording medium loaded in the disk apparatus and a head carriage having a head for recording/reproducing information on/from the recording medium being provided in said frame construction, said frame construction comprising:

a frame body formed of a bent metal plate, said frame body having a base, at least one side plate and a back plate, said side plate and said back plate being bent perpendicularly to said base, said side plate and said back plate lying perpendicular to each other, said driving unit and said head carriage being mounted on said base;

said frame construction having a fixing member integrally formed with said frame body for connecting said side plate and said back plate so that said side plate and said back plate are fixed to each other, said fixing member comprising a first fixing portion comprising a portion of said side plate bent perpendicular to said side plate, and a second fixing portion comprising a portion of said back plate bent to extend substantially perpendicular to said first fixing portion, said first fixing portion and said second fixing portion having first and second planar parts, respectively, that overlap and contact each other such that said first and second planar parts are substantially parallel to one another, said first fixing portion being fixed to said second fixing portion at said first and second planar parts.

2. The frame construction as claimed in claim 1, wherein said back plate has a front side proximate said base and an oppositely facing rear side, wherein said side plate has an extension extending beyond said rear side of said back plate, and wherein said first fixing portion is formed on said extension of said side plate, said second fixing portion being bent rearwardly with respect to said back plate.

3. A frame construction for a disk apparatus into which a cartridge accommodating a recording medium is loaded, a driving unit for driving the recording medium loaded in the disk apparatus and a head carriage having a head for recording/reproducing information on/from the recording medium being provided in said frame construction, said frame construction comprising:

a frame body formed of a bent metal plate, said frame body having a base, at least one side plate and a back plate, said side plate and said back plate being bent perpendicularly to said base, said side plate and said back plate lying perpendicular to each other, said driving unit and said head carriage being mounted on said base;

said frame construction having a fixing member integrally formed with said frame body for connecting said side plate and said back plate so that said side plate and said back plate are fixed to each other, said fixing member comprising a first fixing portion comprising a portion of said side plate bent perpendicular to said side plate, and a second fixing portion comprising a portion of said back plate bent to extend substantially perpendicular to said first fixing portion, said first fixing portion and said second fixing portion having first and second parts, respectively, that overlap each other, each of said first and second parts of said first and second fixing portions having a through-hole, the through-holes of said first and second parts of said first and second fixing portions being aligned with each other, said aligned through-holes containing a fastening means for joining said first and second fixing portions together.

4. The frame construction as claimed in claim 3, wherein a motor for driving said head carriage is mounted on said back plate.

5. The frame construction as claimed in claim 3, wherein said frame body is made of a steel plate.

6. The frame construction as claimed in claim 3, wherein said back plate has a front side proximate said base and an oppositely facing rear side, wherein said side plate has an extension extending beyond said rear side of said back plate, and wherein said first fixing portion is formed on said extension of said side plate, said second fixing portion being bent rearwardly with respect to said back plate.

* * * * *